(12) United States Patent
Hassan et al.

(10) Patent No.: US 6,721,119 B1
(45) Date of Patent: Apr. 13, 2004

(54) SYSTEM AND METHOD FOR CONTROLLING AN ACTUATOR MOTOR DURING RETRACT

(75) Inventors: Mehedi Hassan, Plano, TX (US); Joao Carlos Brito, Richardson, TX (US); John K. Rote, Addison, TX (US)

(73) Assignee: Texas Instruments Incorporated, Dallas, TX (US)

( * ) Notice: Subject to any disclaimer, the term of this patent is extended or adjusted under 35 U.S.C. 154(b) by 319 days.

(21) Appl. No.: 09/640,214

(22) Filed: Aug. 16, 2000

(51) Int. Cl.⁷ .......................... G11B 21/02; G11B 5/596
(52) U.S. Cl. ...................................... 360/75; 360/78.06
(58) Field of Search ................. 360/75, 78.06; 318/362, 363, 368, 459, 439

(56) References Cited

U.S. PATENT DOCUMENTS

| | | | |
|---|---|---|---|
| 5,495,156 A | * | 2/1996 | Wilson et al. .............. 318/368 |
| 5,805,386 A | | 9/1998 | Faris ........................ 360/106 |
| 5,808,438 A | | 9/1998 | Jeffrey ....................... 318/634 |
| 5,821,717 A | | 10/1998 | Hassan et al. .............. 318/560 |
| 6,204,629 B1 | * | 3/2001 | Rote et al. .................. 318/803 |
| 6,271,636 B1 | * | 8/2001 | Galloway .................... 318/127 |
| 6,282,049 B1 | * | 8/2001 | Cameron et al. ............. 360/75 |
| 6,316,898 B1 | * | 11/2001 | Albrecht et al. ............ 318/560 |
| 6,392,375 B1 | * | 5/2002 | Portaluri et al. ........... 318/459 |
| 6,490,116 B1 | * | 12/2002 | Watanabe et al. ............ 360/75 |
| 2001/0019463 A1 | * | 9/2001 | Drouin ....................... 360/75 |

* cited by examiner

Primary Examiner—Andrew L. Sniezek
(74) Attorney, Agent, or Firm—W. Daniel Swayze, Jr.; W. James Brady; Frederick J. Telecky, Jr.

(57) ABSTRACT

A system and method are provided for controlling operation of an actuator for retracting a read/write head of a hard disk drive system. One aspect of the system and method relates to controlling the actuator in response to a retract request command by first decelerating the actuator for a time period and then braking of the actuator for another time period. Another aspect of the system and method relates to controlling operation of the actuator during retract based on a sensed back EMF relative to a target back EMF, which may be selected by a user.

39 Claims, 8 Drawing Sheets

SYSTEM AND METHOD FOR CONTROLLING AN ACTUATOR MOTOR DURING RETRACT

TECHNICAL FIELD

The present invention relates to motor control and, more particularly, to a system and method for controlling operation of an actuator motor during a retract condition in a hard disk drive.

BACKGROUND

A hard disk drive generally includes a stack of rotating disks or platters and a spindle motor that is controlled to cause the disks to rotate. Data is generally stored in the form of a sequence of magnetically polarized regions on the surface of the disk. The sequences, known as tracks, typically appear as concentric circles on the disk.

A read/write head, which is sensitive to changes in magnetic flux, reads and/or writes data to the disks as it is supported by an arm above the surface of the disks in close proximity relative to the disks. An actuator motor (known as a "voice coil motor" or VCM) controls the positioning of the arm for moving read/write heads relative to the surface of the disks. As a disk rotates under the read/write head, the read/write head "flies" on a thin cushion of air created by the motion of the disk. The read/write head reads data from a disk by sensing flux changes on the magnetic surface of an associated disk as it passes beneath the read/write head.

Under certain circumstances, it is desirable to move a read/write head to an area of the disk on which data is not stored or to a location off the disk, referred to as a landing zone or ramp. This may occur when power to the hard drive is lost, when the supply voltage sags, or when the drive is "parked" by the user for any reason. When a retract is requested for a non-critical reason, such as a request by the user to park the hard disk drive, a slow retraction of the read/write head is desirable so as to avoid potential damage to the read/write head caused by sudden acceleration of the head relative to the disk. However, when the hard disk drive supply voltage decreases below a critical level, such as at power failure, fast retraction of the read/write heads is desirable. The read/write head may "crash" into the disk if the disk rotation rate decreases below a critical level. Therefore, when power to the spindle motor is lost or diminished, the head must be moved quickly to a safe landing zone of the disk where it can "land."

If a read/write head is moving when a retract is requested, a brake control function may initially be applied to the VCM for a predetermined time to help slow down the VCM. The brake control function typically is implemented by shorting the VCM. Next, a fixed voltage is applied across the VCM to move the read/write head to its landing zone at a predetermined velocity. However, in certain circumstances, the braking function and fixed voltage may be insufficient to move the read/write head to the landing zone prior to crashing into the disk. The deficiency becomes even more pronounced when a fast retraction is required, such as when retract is initiated during a seek command. During a seek command, the VCM is driven at or near its maximum velocity so as to rapidly move the head to a desired track on the hard drive.

If a read/write head is unable to reach its landing zone, a read/write head and/or its support structure may impact the hub or spindle of the hard disk drive, dislodging small fragments of material, such as aluminum, from the hub or spindle. The fragments may rest on the surface of the disk, creating an uneven surface that would disturb the flight of the read/write head over the disk or damage data on the disk. Moreover, an impact between the read/write head and the disk may damage the disk and/or the read/write head.

SUMMARY

The present invention provides a system and method for controlling an actuator for retracting a read/write head of a hard disk drive system, such as may occur in response to detecting a fault condition of the disk drive system. The present invention, for example, may be implemented in connection with a multi-stage retract sequence.

By way of example, one stage of the retract sequence may employ deceleration followed by braking of an actuator motor. The deceleration may be implemented, for example, by energizing an associated actuator in a selected direction (e.g., by current control) for a predetermined time period. After the deceleration, the actuator motor may be braked, such as by shorting input terminals of the actuator motor to a predetermined voltage level. By rapidly decelerating the read/write head in this manner, the overall retract time may be improved. As a result, damage to the disk and/or the read/write head may be mitigated. In accordance with another aspect of the present invention, the deceleration feature may be enabled or disabled in response to a user-selectable input.

A subsequent stage of a retract sequence, in accordance with an aspect of the present invention, may utilize a sensed back EMF of the actuator motor to adjust energization of the actuator motor. The sensed back EMF is functionally related to the speed of the motor during retract. A sensor may be employed to sense the back EMF, such as during a sampling interval during which the motor is not energized. The sensed back EMF may then be compared with a target back EMF to determine if the actuator is moving too slow or too fast. The velocity of the actuator motor may then be adjusted based on the results of the comparison to move the read/write head toward its rest position at a desired velocity. According to yet another aspect of the present invention, the back EMF control feature may be enabled or disabled in response to a user-selectable input. As a result of controlling retract in accordance with an aspect of the present invention, damage to the disk and/or the read/write head may be mitigated and the read/write head may be moved to a desired landing zone in an efficient and rapid manner.

Yet another aspect of the present invention provides a disk drive read/write head retract system. The system includes a controller having at least two operating modes in response to receiving a retract request signal. When the controller is in a first operating mode, it is operable to provide a deceleration control signal for decelerating an actuator in a selected direction for a first time period. The controller operates in a second operating mode after the first operating mode to provide a brake control signal for braking the actuator for a second time period.

Another aspect of the present invention provides a disk drive read/write head retract system. The system includes a controller for controlling energization of an actuator. A back electromotive force ("EMF") sensor senses back EMF of the actuator. In response to a retract request signal, the controller is operable to control the actuator based on the sensed back EMF relative to a target back EMF value, which target back EMF value may be selected by a user.

Still another aspect of the present invention provides method for controlling an actuator for retracting a read/write head in a disk drive system. The method includes decelerating the actuator in a first direction for a first time period in response to retract request signal and then braking the actuator for a second time period.

Another aspect of the present invention provides a method for controlling an actuator for retracting a read/write head in a disk drive system. The method includes sensing back electromotive force ("EMF") of the actuator and controlling energization of the actuator based on the sensed back EMF relative to a selected target back EMF.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
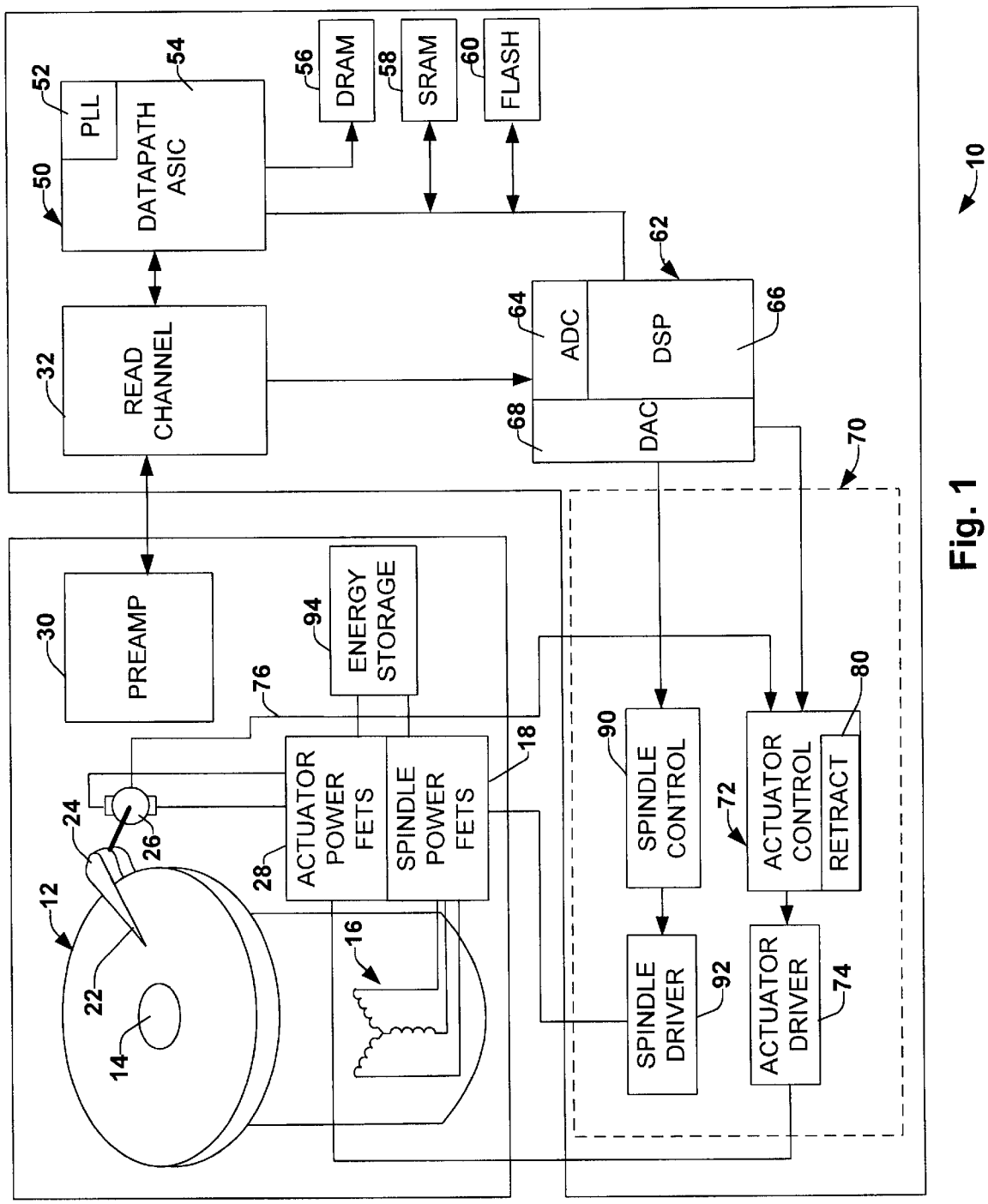
FIG. 1 is an example of a disk drive system in which a retract control system, in accordance with the present invention, may be implemented.

The present invention will now be described with respect to the accompanying drawings in which like numbered elements represent like parts throughout the various drawings. The present invention provides a system and method for controlling operation of an actuator for retracting a read/write head relative to a hard disk drive. According to one aspect of the present invention, a rapid deceleration precedes braking of an actuator for the read/write head. In accordance with another aspect of the present invention, a sensed back EMF of the actuator may be utilized to adjust energization of the actuator during retract. One or both of such aspects may be employed to expedite retraction of a read/write head and/or to mitigate damage to the hard disk drive system, including the disks and read/write head.

In order to provide an exemplary context for a system and method in accordance with the present invention, an overall block diagram of a hard disk drive system 10 is illustrated. Briefly stated, the hard disk drive system 10 includes a plurality of disks 12 mounted on a rotatable spindle, schematically indicated at 14. A spindle motor 16 is operatively connected to the spindle 14 so as to rotate the disks 12 when the motor is energized. A switching device, such an array of power MOSFETs (metal oxide semiconductor field effect transistors) 18 (e.g., two per motor winding) are selectively activated and deactivated to energize the motor for rotating the disks 12. Each disk 12 may have magnetic recording surfaces on both sides of the disk, as is known in the art.

A read/write head 22 is mounted on an actuator arm 24, which is moved radially by an actuator motor 26. The actuator motor 26 is energized by a switching device, such as may include an array of power FETs 28. The FETs 28 are selectively controlled, such as based on a current (or voltage) command signal. It is to be appreciated that typically the actuator motor 26 is employed to move a plurality of support arms in unison, such as to move each associated read/write head radially relative to a respective disk.

The read head 22 detects magnetic flux changes on the surfaces of the disks 12. Each flux change produces a signal that is read by a pre-amplifier 30. The preamplifier 30 transmits the signal to a read channel 32, which decodes and otherwise processes the signal in a manner known in the art. The read channel 32 sends the decoded data to an associated control block 50, which may include a phase-locked loop 52. The phase-locked loop 52 communicates with the read channel 32 to ensure that the data is read from the disk with proper synchronization. The control block 50 also includes an application-specific integrated circuit (ASIC) 54, which processes the decoded data. The ASIC 54 further communicates with the read channel 32, a dynamic RAM unit 56, a static RAM unit 58, a flash memory unit 60, and a digital signal processing block 62.

The read channel 32 sends the decoded data in analog form to the digital signal processing (DSP) block 62. By way of example, the DSP block 62 includes an analog-to-digital converter (ADC) 64, digital signal processing (DSP) circuitry 66, and a digital-to-analog converter (DAC) 68. The digital signal processing block 62 sends signals to a motor control chip 70. The motor control chip 70 includes an actuator control block 72 for controlling operation of the actuator motor 26. The actuator control block 72, for example, provides a control signal to an associated actuator driver circuit 74, which may include one or more power amplifiers. The actuator driver 74 provides a voltage or current command signal to the actuator power FETs 28 for selectively activating and deactivating the FETs to provide a desired amount of electrical energy to the actuator motor 26. One or more conditions (e.g., voltage, current, etc.) of the actuator motor 26 may be sensed, indicated schematically by line 76 to facilitate motor control.

While the actuator power FETs 28 are illustrated as being external to the motor control chip 70, it is to be appreciated that the FETs 28 alternatively may be incorporated into the control chip, such as part of the actuator driver circuitry 74. Those skilled in the art will understand and appreciate that other drive circuit arrangements also may be implemented in accordance with an aspect of the present invention.

The actuator control block 72 controls the operating mode of the actuator motor 26. The operating modes, for example, may include a normal operating mode, a calibration operating mode, a retract operating mode and a back EMF (BEMF) operating mode.

The actuator control block 72 further includes a retract control block 80 for controlling the actuator motor 28 when in the VCM operating mode, such as in response to a seek request signal. A retract request signal indicates that the read/write head should be moved to a selected landing zone. The landing zone may be a location on the disk or a ramp landing zone off the disk, such as may be set by a user of the control chip 70. As set forth below, the retract control 80 may include several aspects or operating modes, including a deceleration mode, a braking mode, a back EMF mode and/or a voltage mode. One or more control features of each of the operating modes may be user configurable to improve the efficiency and speed of retraction.

The control chip 70 also includes a spindle control block 90 that receives input signals from the DAC 68 for controlling operation of the spindle motor 16. The input signals may select a desired running mode of the spindle motor, such as startup, run, coast, and brake. The spindle control block 90 is programmed and/or configured for controlling operation of the spindle motor 16 in each of the respective modes, as is known in the art. The spindle control block 90 provides an output signal to a spindle driver block 92 which, in turn, provides a voltage (or current) command signal to the spindle FETs for controlling energization of the spindle motor 16. The spindle control block 90 may control the current driving the spindle motor 16, for example, by means of either pulse width modulation or linear current control.

The spindle control block 90 provides an output signal to the spindle driver block 92, which, in turn, produces appropriate output signals for selectively activating and deactivating the spindle power FETs 18 for energizing each phase of the spindle motor 16. The output signals switch the respective FETs 18 in synchronization with the rotation of the spindle motor 16 so as to provide the desired torque to the spindle motor. Appropriate sensing circuitry may be employed to facilitate control of the spindle motor 16. By way of example, in the run mode, the desired torque is in the direction of rotation of the spindle motor, while in the brake mode the desired torque is in the opposite direction.

Fly back diodes (not shown) may be operatively connected across each of the spindle power FETs 18 for rectifying current generated by the back EMF of the spindle motor 16. The rectified current may be provided to an energy storage system 94, such as during a fault condition when an external power supply is suddenly removed from the spindle motor 16. Advantageously, the energy storage system 94 may be employed to power the actuator motor 26 and associated controls during a fault condition, including to retract the read/write head 22 to a desired landing zone. The energy storage system 94, for example, may include one or more capacitors configured to store electrical energy, which may be provided to associated controls when needed. It is to be appreciated that other sources of electrical energy also may be utilized to power an actuator motor 28 during a fault condition in accordance with the present invention.

Figure 2:
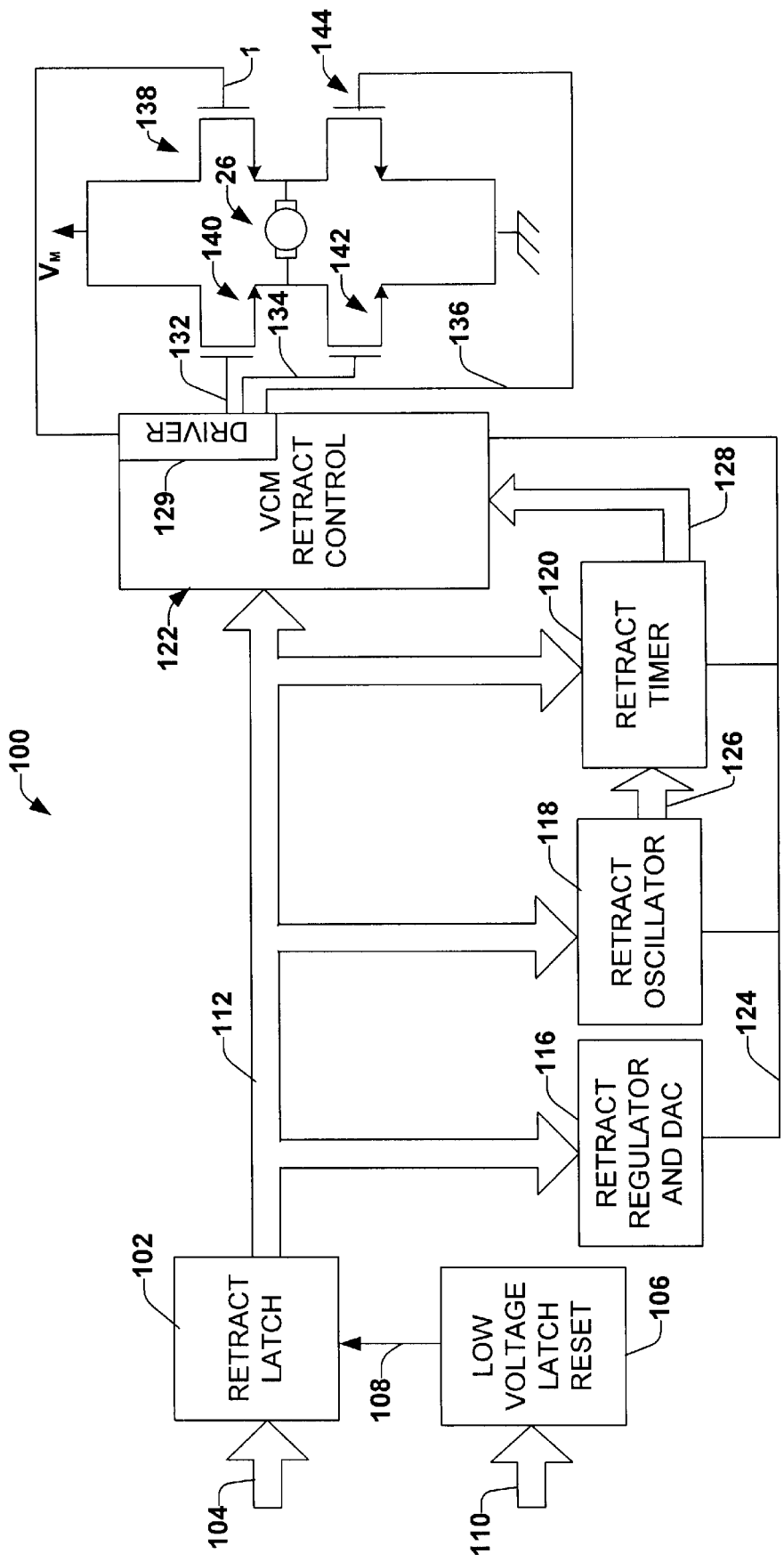
FIG. 2 is a functional block diagram of a retract control system in accordance with the present invention.

FIG. 2 is a functional block diagram of a system 100 for controlling an actuator motor 26 during retract in accordance with an aspect of the present invention. By way of example, the system 100 may correspond to the actuator control block 72 and retract feature 80 shown and described above with respect to FIG. 1. A retract condition may exist when power to the hard drive is lost, when the supply voltage sags below a predetermined level, or when the drive is "parked" by the user for any reason.

The system 100 includes a retract latch 102 that provides an interface for receiving input data to be employed during a retract condition. For example, the retract latch 102 may receive a signal 104 having program data via a serial input port that is used to program various operating characteristics of the actuator motor 26 during retract. The signal 104 also may indicate a present operating mode of the system 100, such as whether the system is in a normal operating mode, a retract mode, a calibration mode, or a BEMF operating mode. Examples of the operating characteristics that may be programmed are listed in Table I. It is to be appreciated that the list of parameters listed in Table I is intended to be illustrative, not exhaustive, of various operating parameters that may be utilized as part of a retract control scheme. Accordingly, those skilled in the art may appreciate other control features that may be set to control the actuator motor 26 during a retract condition, all of which are intended to be within the scope of the present invention.

TABLE I

| PARAMETER | FUNCTION |
|---|---|
| DECEL_DIR | Sets a deceleration direction for a fault induced retract |
| DECEL_FLAG | Indicates whether deceleration should be performed on a fault induced retract |
| DUTY | Selects sample-to-drive duty cycle for retract BEMF control |
| FLOAT | Selects float time for sampling during retract BEMF control |
| GM | Selects the gain factor to be used by an output stage during retract BEMF control |
| INT_GAIN | Sets the integrator step size gain for retract BEMF control |
| RET_DIR | Sets retract direction relative to the landing zone |
| RET_STYLE | Indicates whether to apply fixed voltage control for retract BEMF control |
| T_BEMF_A | Selects target BEMF voltage for retract BEMF control if RET_DIR=1 |
| T_BEMF_B | Selects target BEMF voltage for retract BEMF control if RET_DIR=0 |

A low voltage latch reset function block 106 may be operatively associated with the retract latch 102 for providing a reset signal 108 to the retract latch. The latch reset 106 may provide a reset signal (e.g., logic LOW) to the retract latch 102, for example, upon registering that the system voltage $V_M$ drops below a predetermined level for greater than a predetermined time period. The reset latch 106 may receive an input signal 110 from associated monitoring circuitry (not shown) indicative of a fault condition. By way of example, a fault condition may exist when the system voltage ($V_M$) has dropped below a threshold value (e.g., about 10 V) for at least a predetermined time period (e.g., greater than about 20 $\mu$s). The input signal 110 also may be based on operating characteristics sensed by a spindle voltage monitoring circuit, fault detection circuitry of the actuator or the main system, from an over-temperature protection circuit, or any other system component that may monitor a condition for which a retract condition may be desired.

In response to the reset signal 108 indicating that the system should be in a retract condition or the signal 104 indicating a retract operating mode, the latch 102 stores a value for each of the operating parameters as programmed, including any default values where appropriate. The retract latch 102, in turn, provides the operating parameter values as an output signal 112. The operating parameter data signal 112 is provided to a retract regulator and DAC block 116, a retract oscillator block 118, a retract timer block 120, and a retract control block 122.

The retract regulator and DAC block 116, for example, is an internal voltage regulator for providing a predetermined regulated voltage level, which may be a DC voltage level below the system voltage $V_M$. The regulator block 116 provides a regulated output voltage 124 for use by other circuit components, such as the retract oscillator 118, the retract timer 120, and the retract control 122.

The retract oscillator block 118, for example, is an internal clock that provides an output signal 126 having clock pulses at a desired frequency. The frequency may be programmable based on pertinent frequency data contained in the retract latch output signal 112 and/or based on the operating mode of the system 100. The clock pulses 126 are provided to the retract timer 120.

The retract timer 120 provides pertinent timing control signals 128 to the retract control block 122. The timing control signals 128 are utilized by the retract control block 122 to control operation of the actuator during retract.

The retract control block 122 includes a driver 129 having outputs 130, 132, 134, and 136 electrically connected to respective switching devices (such as FETs) 138, 140, 142, and 144. The FETs 138, 140, 142, and 144 are connected to the actuator motor 26 in an H-bridge configuration. The driver 129 drives the FETs 138–144 to energize the actuator motor 26 to a desired level in a desired direction. The retract control block 122 controls the actuator motor 26 based on the retract latch output signals 112 and the timing control signals 128. More particularly, the retract control block 122 may be programmed and/or configured to control the actuator motor 26 in a selected operating mode according to which stage of the retract sequence the system 100 is operating.

Figure 3A:
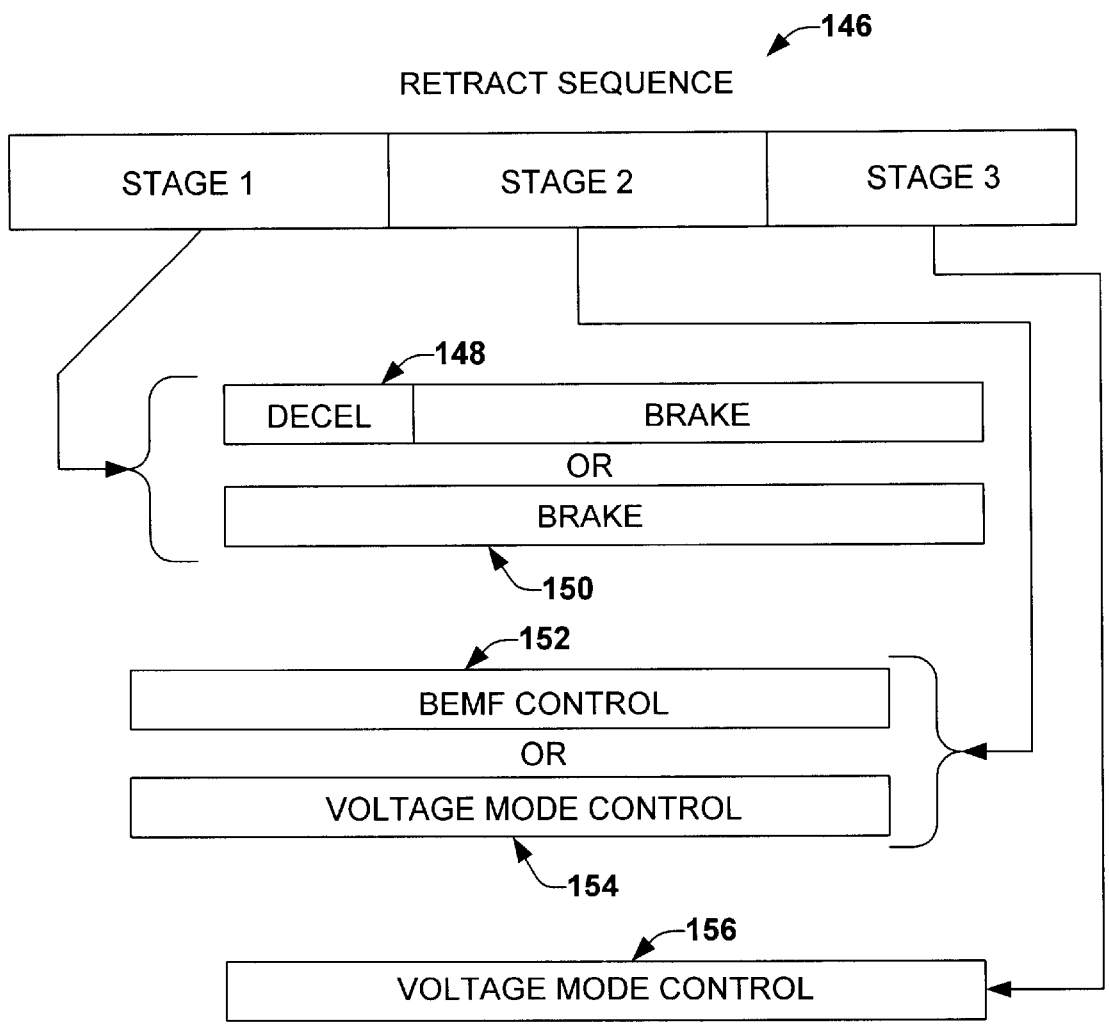
FIG. 3A is schematic representation of a retract control sequence in accordance with an aspect of the present invention.

FIG. 3A is a schematic representation of an example of a retract control sequence 146 that may be implemented in accordance with an aspect of the present invention. The retract sequence 146 includes three stages, represented as Stage 1, Stage 2, and Stage 3.

Stage 1 of the retract sequence may include one or both of two different user-selectable operating modes, namely, a first (DECEL) mode 148, which includes rapid deceleration followed by braking and a pure braking (BRAKE) mode 150. For example, rapid deceleration occurs by applying electrical current to the actuator motor 26 in a direction relative to the landing zone, whereas the braking may be achieved by shorting the terminal inputs of the actuator motor 26 to a selected voltage level.

Stage 2 of the retract sequence 146 also includes more than one possible operating mode. In particular, Stage 2 may include a BEMF mode 152 or a voltage mode 154. In the BEMF mode 152, the actuator motor 26 is controlled based on a sensed BEMF value relative to a target BEMF, which may be selected by the user. In contrast, the voltage mode 154 energizes the actuator motor 26 by applying a fixed voltage across the actuator motor. Stage 3 of the retract sequence 146 also controls the actuator motor by operating in a voltage mode 156, which is substantially identical to the voltage mode 154 (a fixed voltage is applied to motor 26).

Referring between FIGS. 2 and 3A, for example, the timing control signals 128 may include a deceleration signal and a brake signal for respectively decelerating and braking the actuator motor 26. The timer block 120 may provide the deceleration and/or brake signals to the retract control block 122 during Stage 1 of the retract sequence. Stage 1 of the retract sequence may occur during a braking interval (T_BRAKE), such as about 3.2 milliseconds. For example, a user may program and/or configure the system 100, such as by setting the DECEL_FLAG, to employ braking only (mode 150 of FIG. 3A) or a combination of a rapid deceleration and braking (mode 148 of FIG. 3A) to control the operation of actuator motor 26. If deceleration is enabled (e.g., DECEL_FLAG=1), the user also may select a direction of deceleration relative to a landing zone, such as by setting the DECEL_DIR parameter accordingly.

Deceleration, when enabled, occurs during a first part of the braking interval, which may be functionally related to the braking interval T_BRAKE, such as about the first twenty-five percent of T_BRAKE (e.g., T_DECEL= 0.25*T_BRAKE). A deceleration may be implemented by the retract control block 122 controlling the FETs 138–144 to apply a fixed amount of electrical current to the actuator motor 26. In contrast, a brake of the actuator motor 26 occurs by shorting the actuator motor, such as by activating both high-side FETs 138 and 140 to the ON condition during T_BRAKE. As a result, both input nodes of the actuator are connected to the system voltage $V_M$ during braking.

The timing control signals 128 also may include a float signal and a sample signal. The float and sample signals may occur during Stage 2 of the retract sequence 146 (FIG. 3A) after the braking interval is completed in Stage 1.

Figure 3B:
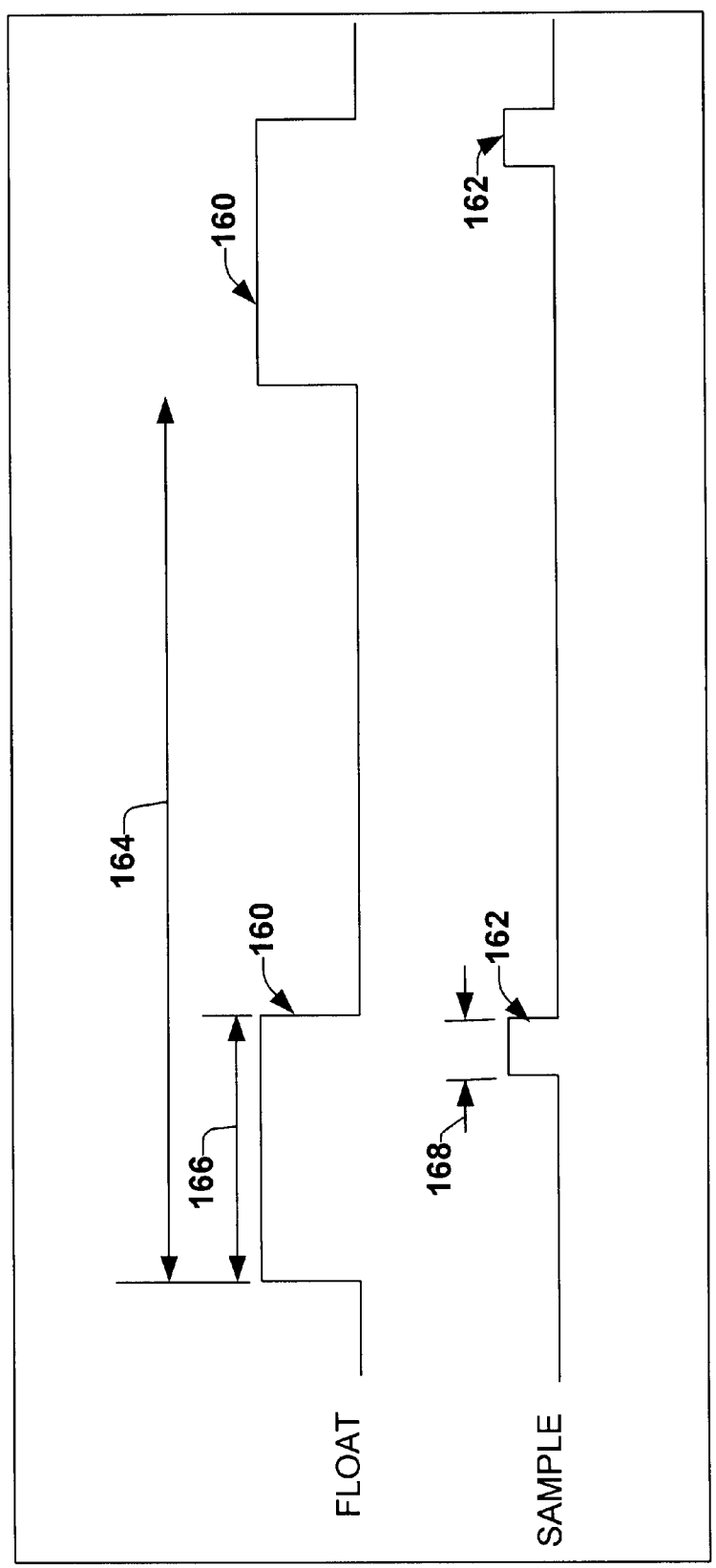
FIG. 3B is an example of a timing diagram of signals that may be utilized in the system of FIG. 2.

A graphical representation of interrelationship of the float and sample signals 160 and 162, respectively, is illustrated in FIG. 3B. The float and sample signals 160 and 162 repeat at regularly recurring intervals, indicated at 164. The float signal 160 is a regularly recurring pulse having a duration indicated at 166. The float signal 160 sets the amount of time that the actuator motor 26 will coast or float during Stage 2 of the retract sequence if the BEMF mode 152 (FIG. 3A) is enabled. The float time 166 may be a user configurable duration, such as a duration based on the value of the float parameter (FLOAT) provided with the retract latch output signal 112. The float time 166, for example, should be selected to provide sufficient time for the transient effects of the drive current in the actuator to decay. That is, the sample signal pulse 162 occurs near the end of the float pulse 160 when the current through the motor 26 is substantially zero. During the sample interval 168 the voltage across the actuator motor 26 is sensed or sampled. The sampled voltage corresponds to the BEMF of the actuator motor 26. The BEMF is proportional to the velocity of the actuator motor 26. Therefore, in Stage 2 of the retract sequence 146 when the BEMF mode 152 (FIG. 3A) is enabled, the velocity of the motor 26 may be determined by sensing the motor BEMF at a sample time (related to the selected FLOAT time period) in which the motor current is approximately zero.

Figure 4:
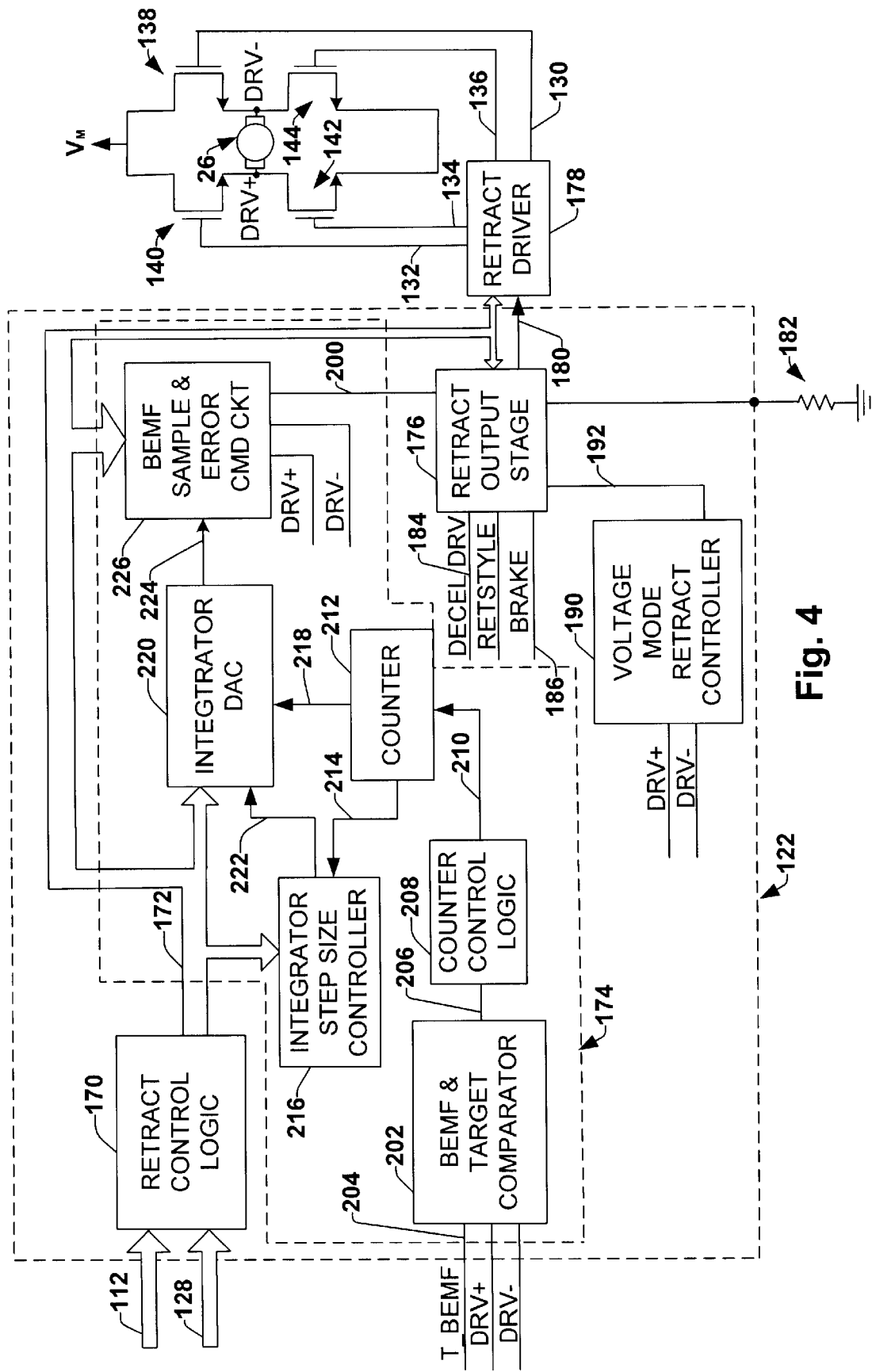
FIG. 4 is a functional block diagram of part of the system of FIG. 2, illustrating the retract control block in greater detail in accordance with one aspect of the present invention.

FIG. 4 is a functional block representation of part of the system 100 shown in FIG. 2, in which the retract control block 122 is illustrated in greater detail for controlling the actuator motor 26 during retract. As mentioned above, the retract control block 122 may include multiple operating modes, which may include a deceleration mode, a braking mode, a BEMF mode, and a voltage mode. In addition, the operating modes may vary according to which stage of the retract condition the system is operating in.

The retract control logic block 122 includes a retract control logic block 170 for receiving the signals 112 from the retract latch 102 (FIG. 2) as well as the signals 128 from the timer 120 (FIG. 2). The retract logic 170 is programmed and/or configured to provide control signals 172 for controlling operating characteristics of other control components of the retract control block 122. In particular, the control signals 172 are provided to a BEMF mode control function 174, a retract output stage 176, and a retract driver 178.

The retract output stage 176 provides a current command signal 180 to the retract driver 178. The retract driver 178, in turn, provides control signals via outputs 130, 132, 134, and 136 for controlling activation of the respective FETs 138, 140, 142, and 144. The current command signal 180 varies according to the operating mode of the retract control block 122.

In the example illustrated in FIG. 4, a user-selectable resistor 182, which is external to the retract control circuit block 122, is connected to the retract output stage 176 for controlling the level of current to be applied to the actuator 26 during a retract condition. It is to be appreciated that other external (as well as internal) mechanisms may be utilized, in accordance with an aspect of the present invention to enable a user to select a desired current level during retract.

By way of example, when the system 100 is in a deceleration operating mode (Stage 1), the retract output stage 176 provides a current command signal 180 so that a fixed current is applied through the actuator coil 26 for a predetermined percentage of the brake time (T_BRAKE). The output stage 176 may provide the deceleration command signal 180 in response to a deceleration drive signal 184 being provided to the retract output stage 176 during the deceleration mode. The deceleration drive signal 184 may be provided to the output stage 176 through an appropriate switch module (not shown), such as based on the timer signal 128 and the latch signal 112 as indicated by the retract control logic 170. The direction of current flow through the actuator motor 26 depends on the deceleration direction (DECEL_DIR), which may be provided to the retract output stage 176 by the retract control logic 170. The deceleration mode advantageously decreases the amount of time needed to slow down the actuator motor 26 to facilitate movement of the head to its landing zone.

Similarly, when the system 100 is in a braking mode, which may follow or be employed instead of deceleration, the retract output stage 176 provides a current command signal 180 to the retract driver 178 for braking the actuator motor. For example, the current command signal 180 may turn both high-side FETs 138 and 140 to an ON condition and both low-side FETs 142 and 144 to an OFF condition, so that the system voltage $V_M$ is applied to both nodes of the actuator motor 26. The retract output stage 176 provides the brake command signal 180 in response to a brake input signal 186 being provided to the output stage, such as may be switched in by an appropriate switching module (not shown).

At the conclusion of the braking mode, the retract control enters Stage 2 of retraction, which may include either a voltage mode control or a BEMF mode control according to the program data received by the retract latch 102 (FIG. 2). For example, the operating mode during Stage 2 may be configured based on a retract style parameter, which may be programmed and/or configured by a user.

A voltage mode retract may be enabled at Stage 2 by setting the retract style to a first condition (e.g., RET_STYLE=0). In the voltage mode, a voltage mode retract controller 190 is operative to provide a voltage command signal 192 to the retract output stage 176 so that a fixed voltage, such as about 1 V DC, is applied across the actuator motor 26. By way of example, the voltage mode controller 190 receives voltage signals indicative of the actual voltage of the actuator nodes DRV+ and DRV− (the voltage across the actuator motor 26). The voltage values are subtracted and compared with a predetermined voltage value, such as about 1V DC, to provide feedback for maintaining the actuator at the desired fixed voltage until the retract condition is removed.

Alternatively, the BEMF function block 174 may be activated at stage 2 provided that the BEMF mode control has been enabled, such as based on the RET_STYLE parameter (e.g., RET_STYLE=1). When the BEMF function block 174 is activated a variable voltage command signal 200 is provided to the retract output stage 176. The voltage command signal 200 has an electrical characteristic indicative of a voltage value that varies based on a sensed BEMF of the actuator motor 26 relative to a target BEMF value (e.g., T_BEMF_A or T_BEMF_B).

Turning now to the contents of the BEMF function block 174, the block includes a BEMF and target comparator 202 for comparing the relative voltage across the actuator motor 26 with a target BEMF value (T_BEMF) 204. The user may select the target BEMF value, which corresponds to a target velocity of the motor. By way of example, the sensed BEMF is determined from voltage signals DRV+ and DRV− indicative of the actual voltage at the nodes of the actuator motor 26. A BEMF voltage value (VBEMF) may be determined based on the difference between the voltages DRV+ and DRV− (e.g., $V_{BEMF}$=DRV+−DRV−). The $V_{BEMF}$ is proportional to the velocity of the actuator motor 26. The target BEMF voltage 204 may be compared with the sensed BEMF to provide a comparator output signal 206 indicative of the difference between the target value and the actual sensed BEMF.

The comparator output signal 206 is provided to a counter control logic block 208. The counter control logic block 208 determines whether the actuator motor 26 is moving too fast or too slow relative to the target BEMF value based on the comparator signal 206. The counter logic 208, in turn, provides a counter logic output signal 210 to a counter 212 indicative of whether the actuator motor is moving too slow or too fast relative to the target BEMF value. For example, if the actuator motor 26 is moving too fast, the counter logic block 208 provides the output signal 210 that will result in the actuator motor 26 slowing down. Conversely, if the actuator motor 26 is moving too slow, the counter logic block 208 provides the output signal 210 that will result in the actuator speeding up.

The counter 212 employs the signal 210 to increment the counter value (e.g., when the actuator is too slow), decrement a counter value (e.g., when the actuator is too fast), or neither increment or decrement the counter (e.g., when the sensed BEMF is equal to the target BEMF). The counter 212 provides an output signal 214 to an integrator step size controller 216 indicative of the counter value. The counter 212 also provides an output signal 218 to an integrator DAC 220 indicative of the counter value.

The integrator step size controller 216 controls the size of the integrator step corresponding to each counter value, such as based on the INT_STEP parameter. That is, integrator step size controller 216 contributes a voltage proportional to the selected step size based on the counter value indicated in the counter signal 214. TABLE II illustrates an example of step sizes for a situation where two bits are utilized for the step size parameter.

TABLE II

| INT_GAIN | STEP SIZE |
| --- | --- |
| 00 | 0 mV |
| 01 | 25 mV |
| 10 | 50 mV |
| 11 | 75 mV |

The integrator step size controller 216 also may control how long the system 100 will remain in Stage 2 of the retract sequence. By way of example, if the retract direction is selected to be toward the landing zone/ramp (e.g., RET_DIR=0), the step size controller 216 determines an end to Stage 2 of the retract sequence in response to the counter 212 reaching a maximum count value. If the retract direction is selected to be away from the landing zone (e.g., RET_DIR= 1), then Stage 2 may continue to run indefinitely until the retract command is removed. The step size controller 216 provides a digital output signal 222 to the integrator DAC 220 indicative of a voltage value based on the count value times the selected step size.

The integrator DAC 220 converts the voltage value provided by signal 222 into an appropriate analog voltage signal for each count value. The integrator DAC 220 provides an adjusted analog voltage signal 224 to a BEMF sample and error comparator block 226. The adjusted analog voltage signal 224 is functionally related to the counter value and the integrator step size parameter. That is, the adjusted voltage value 224 provides a voltage value proportional to the counter value times the integrator step size parameter (e.g., $V_{ADJUSTED}$=COUNT*INT_GAIN).

The comparator block 226 receives voltage signals DRV+ and DRV− from the actuator nodes in addition to the voltage signal 224 from the integrator DAC 220. The comparator block 226 determines an error signal based on, for example, two summing operations. One summing operation determines an actual value of the BEMF, such as based on the difference between the voltages DRV+ and DRV− (e.g., $V_{BEMF}$=DRV+−DRV−). The adjusted voltage signal 224 is then added to the target BEMF value to provide another adjusted voltage value. The $V_{BEMF}$ is then compared with (e.g., subtracted from) from this voltage value to provide the voltage command signal 200 to the retract output stage 176. The command signal 200 is an error signal corresponding to the difference between an adjusted command target voltage value and the $V_{BEMF}$ value. The voltage command value is employed to control energization of the actuator motor 26 during the BEMF control mode of Stage 2 in the retract sequence. As mentioned above, the BEMF control mode is user selectable, such as by appropriately setting the retract style parameter (e.g., RET_STYLE=1).

Figure 5:
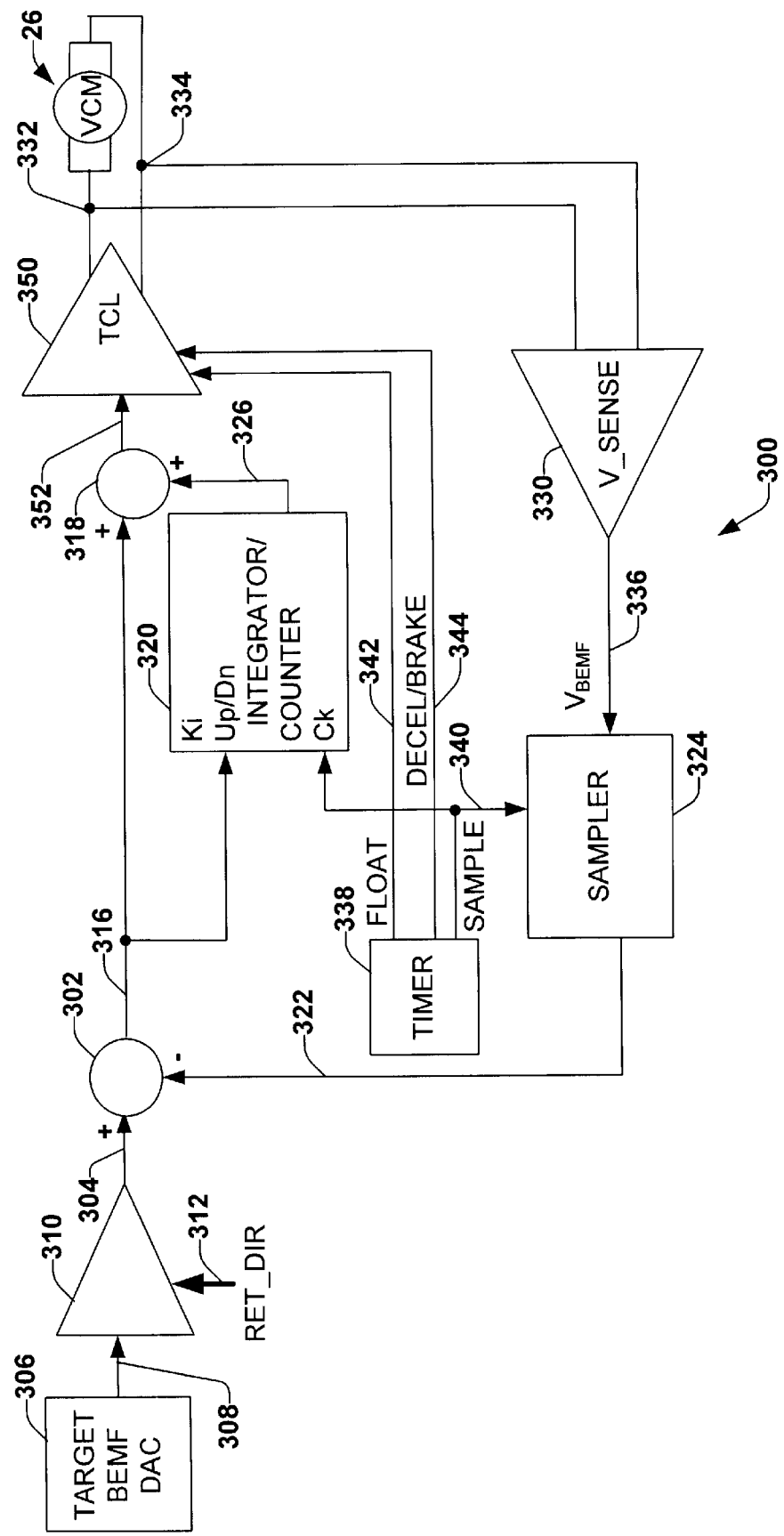
FIG. 5 is another functional block diagram of a retract control system in accordance with the present invention.

FIG. 5 illustrates an example of a functional block representation of a control circuit 300, such as may be implemented during a retract sequence when the BEMF mode control is enabled (e.g., RET_STYLE=1). Briefly stated, during Stage 1 of the retract sequence, the control circuit 300 controls the actuator motor 26 by deceleration and/or braking, such as described above. After stage 1, the control circuit controls operation of the actuator motor 26 in the BEMF mode, in which the velocity of the motor is maintained at a desired level based on the sensed BEMF of the actuator motor relative to a target BEMF value.

In order to obtain an accurate measurement of the actuator BEMF, current should not be flowing through the actuator motor 26 during the measurement. The control circuit 300, thus, is programmed and/or configured for obtaining the BEMF measurement near the end of a sample interval during which current flow through the actuator is interrupted so that current goes substantially to zero. It is a characteristic of the actuator that the BEMF voltage does not change rapidly after the current flow through the actuator motor 26 is decreased to zero, once short-term transient effects have died down.

The control circuit 300 includes a summing block 302 that receives an amplified target command voltage signal via line 304. The voltage command signal varies as a function (e.g., divided by a factor of two) of a target BEMF value (e.g., T BEMF_A or T_BEMF_B), which may be selected by a user. In particular, a target BEMF DAC 306 provides an analog voltage output signal on line 308 to a voltage amplifier 310 according to a stored target value. The amplifier 310, which may be a substantially linear amplifier, modifies the voltage output signal relative to the system voltage $V_M$ to a desired level and to a proper signal convention (e.g., positive or negative) according to the selected retract direction (RET_DIR), indicated at 312. The target BEMF input parameter enables a user to select a target voltage during retract and, in turn, selectively control the velocity of the actuator motor 26 (and support arm) during retract. An example of a three bit target BEMF value ranging from 0.2 or 0.9 V is listed in Table III, although those skilled in the art will understand and appreciate that other voltage values and voltage control schemes may be employed in accordance with an aspect of the present invention.

TABLE III

| T_BEMF | TARGET VOLTAGE (V) |
| --- | --- |
| 000 | 0.2 |
| 001 | 0.3 |
| 010 | 0.4 |
| 011 | 0.5 |
| 100 | 0.6 |
| 101 | 0.7 |
| 110 | 0.8 |
| 111 | 0.9 |

An output signal 316 of the summing block 302 is provided to a non-inverting input of another summing block 318. The output signal 316 from the summing block 302 also is provided to an integrator/counter unit 320. The output signal 316 is an error signal based on a comparison of the amplified target voltage command signal provided on line 304 and a signal 322 indicative of a sample BEMF voltage value of the actuator motor 26. The sampled BEMF signal 322 is provided to an inverting input of the summing block 302 by a sample module 324. Accordingly, the output signal 316 is indicative of voltage value proportional to the difference between the target BEMF value provided on line 304 and the sensed BEMF value provided by the sampler module 324.

The integrator/counter unit 320 provides an output signal 326 to a non-inverting input of the summing block 318. The output signal 326 corresponds to a determined step size increase or decrease in a voltage command signal based on the value of the output signal 316. The user may select the step size adjustment to the voltage command signal, such as by setting the INT_GAIN to a desired value (See, e.g., Table II). For example, the integrator/counter unit 320 includes a counter that counts up or down each sampling interval depending on whether the sensed BEMF is less than or greater than the target BEMF value. When the actuator motor 26 is moving too slow, the sensed BEMF is less than the target BEMF value and, conversely, when the actuator is moving too fast, the sensed BEMF is greater than the target BEMF value. Accordingly, the counter incrementally adjusts the count value to, for example, run the actuator at a desired velocity corresponding to the user-configurable target BEMF.

A voltage sense unit 330 is operatively connected to respective input terminals 332 and 334 of the actuator motor 26. The voltage sense unit 330 provides an output signal 336 to the sampler module 324 having an electrical characteristic indicative of the voltage across the input terminals of the actuator motor 26. In order to obtain an accurate measurement of the actuator BEMF, current should not be flowing through the actuator motor 26 during the sampling interval, as such current produces voltage across the actuator terminals 332 and 334 in addition to that corresponding to BEMF.

A timer unit 338 generates three timing signals 340, 342, and 344 for controlling operation of the control circuit 300. One signal is a SAMPLE timing signal 340. The timer unit 338 supplies the SAMPLE timing signal 340 to the sampler 324 and to a clock input of the integrator/counter unit 320. The sampler 324 samples the voltage signal 336 during the sample interval. The integrator/counter unit 320 further processes the output signal and increments and decrements its internal counter during each sample interval provided by the SAMPLE signal 340.

The timer unit 338 also generates a FLOAT signal 342 and a BRAKE/DECEL signal 344, which are provided to a transconductance linear (TCL) amplifier 350 for controlling operation of the TCL amplifier. By way of example, the TCL amplifier 350 interrupts or discontinues current flow through the actuator motor 26 in response to the FLOAT signal 342. The TCL amplifier 350 controls the current flow through the actuator in predetermined manner in response to the BRAKE/DECEL signal 344, such as described above.

The TCL amplifier 350 receives a voltage (or current) command signal 352 from the summing block 318. The voltage command signal 352 is an adjust command signal corresponding to the sum of the output signal 326 and the error signal 316. The TCL amplifier 350 converts the voltage command signal 352 into actual drive currents that are provided to the terminals 332 and 334 of the actuator motor 26.

The timing and operation of the control circuit 300 of FIG. 5 may be better understood with reference between FIG. 5 and the signal timing diagram shown in FIG. 3. As can be seen in FIG. 3, the FLOAT signal 150 is a regularly recurring rectangular pulse. When the timer 338 begins the FLOAT signal 150, the TCL amplifier 350 (FIG. 5) turns OFF the drive signals to the actuator motor 26. After sufficient time for the transient effects of current in the actuator motor 26 to die down, the timer generates the SAMPLE pulse 152. The SAMPLE pulse 152 is provided for a sufficiently long period of time to enable the sampler module 324 to sense the voltage at the output of amplifier 116. Shortly after the SAMPLE pulse 150 ceases, the FLOAT pulse 150 also ends. A short time thereafter, the TCL amplifier 350 is controlled to resume the drive signals based on the current command signal 352. The sequence described above repeats regularly during the BEMF mode of Stage 2 of the retract sequence.

Referring back to FIG. 5, the voltage sense unit 330 senses the voltage across terminals 332 and 334. The timer unit 338 applies the FLOAT signal 342 to the amplifier 350, thus interrupting the drive current, a short time after which the SAMPLE signal 340 is provided to the sampler 324, which samples and stores the voltage output from voltage sense unit 330. Accordingly, the sampler 324 senses and stores an indication of the back-EMF voltage on a regularly occurring basis, which stored value is substantially undisturbed by voltage effects produced by the application of the drive currents. The sampled and held BEMF voltage value (signal 322) is provided to an inverting input of the summing block 302, where it is subtracted from the target BEMF voltage provided on line 304 to yield the feedback-corrected (or error) control signal 316. The error signal 316 is applied to a non-inverting input of the summing block 318 and to the integrator/counter unit 320.

The integrator/counter unit 320 is employed to slow down or speed up the actuator motor 26 depending on how the braking/deceleration during Stage 1 of the retract sequence affected the actuator velocity. This may be desired, for example, if the retract is initiated during a hard drive "hard seek" operation. In a hard seek, the actuator motor 26 may be driven near maximum velocity for rapidly moving the head to a desired track on the hard drive. The voltage corresponding to this velocity might be, for example, about 7 Volts. In contrast, an exemplary voltage corresponding to a desired retract operation speed may be about one volt.

The integrator/counter unit 320 allows the control circuit 300 to adjust the velocity in a desired direction to correct disparity between the actual speed and the target speed, which is based on the target BEMF. For example, the integrator/counter unit 320 responds well to even large and abrupt changes in torque load, which may exist in a retract operation. When a large torque load change is encountered, the integrator/counter unit 320 incrementally adjusts the current command signal in a step size manner by counting up or down each sample interval according to the sensed BEMF relative to the target BEMF. The integrator/counter unit 320, in turn, increases or decreases the current command value based on the INT_GAIN parameter value and the counter value, so as to maintain substantially constant velocity despite the resultant velocity that the torque load change is inducing. As a result, the integrator counter unit 320 provides an adequate magnitude compensating current command to maintain a constant motor velocity while mitigating destabilization of the control circuit 300.

Figure 6A:
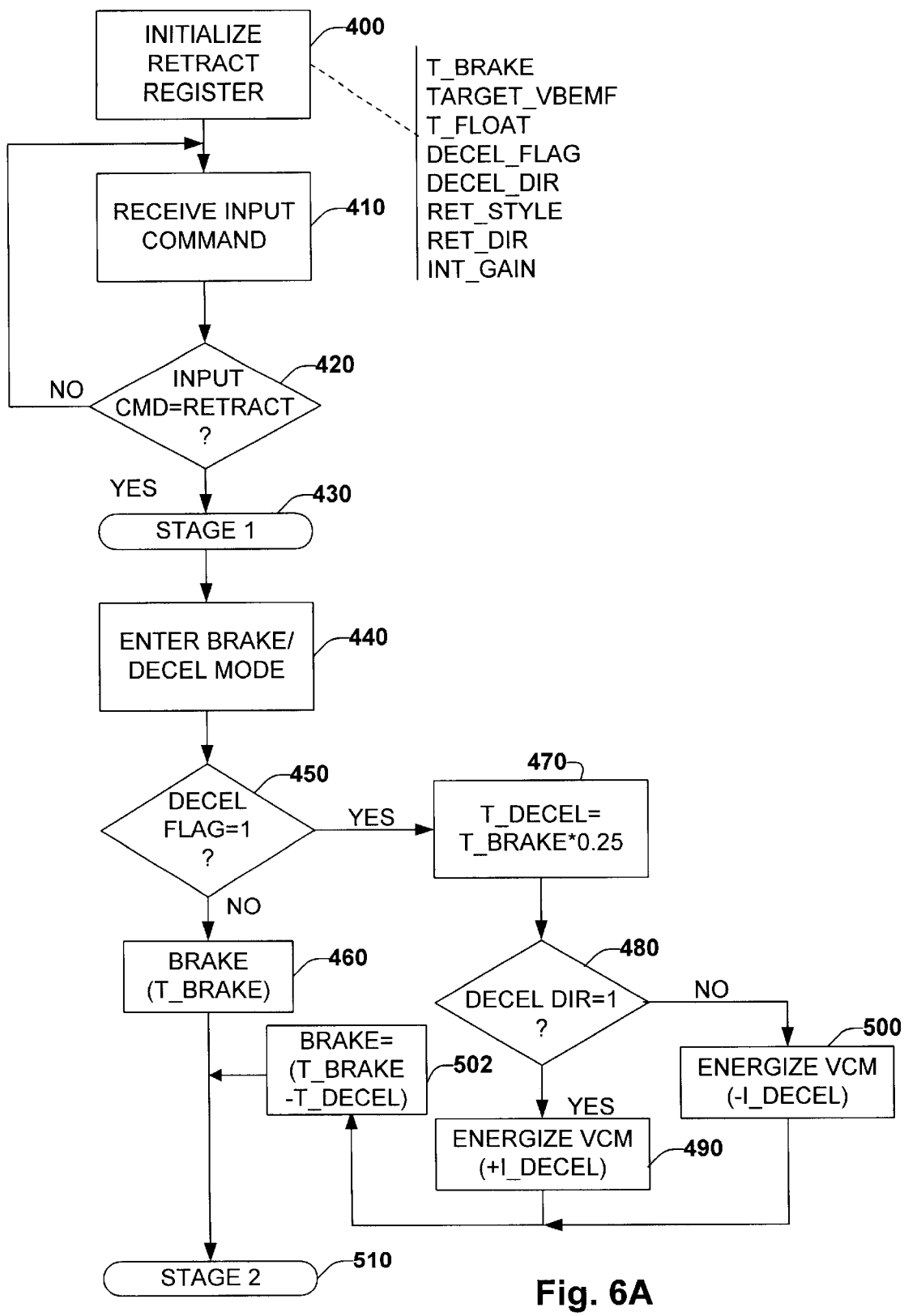
FIG. 6A is flow diagram illustrating part of a methodology for controlling an actuator during retract.
Figure 6B:
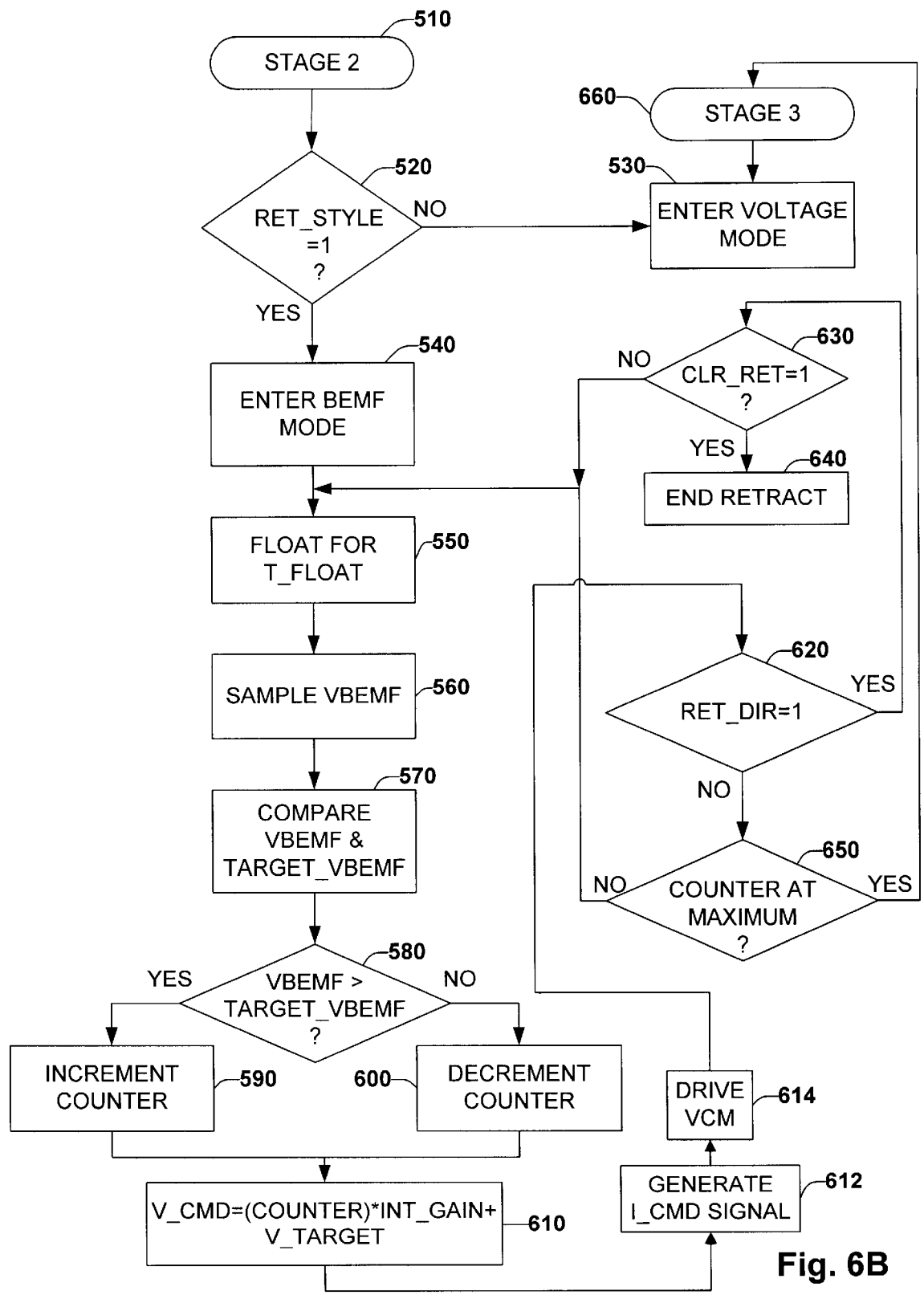
FIG. 6B is a flow diagram illustrating another part of a methodology for controlling an actuator during retract.

FIGS. 6*a* and 6*b* are a flow diagram representing a retract methodology in accordance with an aspect of the present invention. While, for purposes of simplicity of explanation, the methodology of FIGS. 6*a* and 6*b* is shown and described as a series of steps, it is to be understood and appreciated that the present invention is not limited to the order of steps, as some steps may, in accordance with the present invention, occur in different orders and/or concurrently with other steps from that shown and described herein. For example, a methodology in accordance with an aspect of the present invention may be represented as a combination of various states (e.g., in a state diagram). Moreover, not all illustrated steps may be required to implement a methodology in accordance with an aspect the present invention.

The process begins at step 400 in which a retract register is initialized. The retract register may include various parameters for controlling operation of an actuator motor during a retract condition. By way of example, the parameters may include those listed in Table 1 above as well as others that may be appreciated by those skilled in the art. From step 400 the process proceeds to step 410.

At step 410 an input command is received. The input command may be indicative of the operating mode of the actuator, a detected fault condition, or other commands for controlling operation of an actuator motor. From step 410, the process proceeds to step 420, in which a determination is made as to whether the input command is a retract command signal. If the input command is not a retract command, the process returns to step 410 and the actuator may be controlled in one of its other operating modes, as is known in the art. If the input command is a retract command, however, the process proceeds to step 430.

At step 430, Stage 1 of the retract sequence is entered. The process proceeds to step 440 in which the brake/deceleration mode is entered. This mode may consist of a deceleration condition and a braking condition or just a braking condition. From step 440 the process proceeds to step 450.

At step 450, a determination is made as to whether the deceleration flag condition (DECEL_FLAG) is set equal to one. If the deceleration flag is not set equal to one (e.g., DECEL_FLAG=0), the process proceeds to step 460 in which the actuator motor is braked for a braking time interval T_BRAKE. If the determination at step 450 is affirmative, the process proceeds to step 470 in which a deceleration time interval is set equal to 25 percent of the braking interval (T_DECEL=0.25*T_BRAKE). The process then proceeds to step 480.

At step 480, a determination is made as to whether the deceleration direction (DECEL_DIR) is set equal to one. If the deceleration direction is equal to one, the process proceeds to step 490. At step 490, the actuator motor is energized with a fixed current of, for example, about 1.5 amps in the direction toward the landing zone. In the event the deceleration direction is set equal to zero, the process proceeds to step 500. At step 500, the actuator motor is energized so that the deceleration is away from the landing zone, such as applying a fixed current of about 1.5 amps in the opposite direction through the motor coil.

From each of steps 490 and 500 the process proceeds to step 502, in which the actuator motor is braked. As indicated above, braking may be accomplished by activating each of the high side FETs to the ON condition for the remaining portion of the brake interval (T_BRAKE–T_DECEL). From each of steps 460 and 502, the process proceeds to step 510 in which Stage 2 of the retract sequence is entered.

An example of a methodology for Stage 2 of the retract sequence is illustrated in FIG. 6*b*. From step 510, the process proceeds to step 520 in which a determination is made as to whether the retract style (RET_STYLE) is set equal to one. One retract style (e.g., RET_STYLE=1) indicates a BEMF mode, whereas another retract style (e.g., RET_STYLE=0) is indicative of a standard voltage mode control. If the determination at step 520 is negative, the process proceeds to step 530 in which the voltage mode is entered, such as for the remainder of the retract process. In the voltage mode, a fixed voltage, such as about 1 volt, is applied across the actuator motor with a polarity according to the selected retract direction (RET_DIR).

If the determination at step 520 is affirmative, indicating that the BEMF mode has been enabled, the process proceeds to step 540. At step 540, the BEMF operating mode is entered. In the BEMF operating mode, selected amplifiers and other circuitry are enabled for controlling operation of the actuator based on a sensed BEMF of the actuator motor. The BEMF of the actuator motor is proportional to the voltage across the actuator after the current through the actuator has decayed to about zero.

From step 540, the process proceeds to step 550 in which a float interval is implemented for duration T_FLOAT. The float interval provides a time period in which drive current to the actuator motor is interrupted, such as by controlling a driver not to pulse-width-modulate selected FETs. Near the end of the float interval, after the drive current is approximately zero, the process proceeds to step 560. At step 560, the BEMF voltage is sampled. An example of the relationship between the float interval and the sampling interval of steps 550 and 560 is illustrated in FIG. 3. The process then proceeds to step 570.

At step 570, the sampled BEMF voltage (V_BEMF) and a target BEMF voltage (TARGET_VBEMF) are compared. The target BEMF voltage is a user selectable value that is employed to control the speed of the actuator motor during Stage 2 of the retract sequence when the BEMF mode is enabled. The process then proceeds to step 580, in which a determination is made as to whether the sensed BEMF voltage is greater than the target BEMF voltage. If the determination at step 580 is affirmative, the process proceeds to step 590 in which a counter is incremented. If the determination at step 580 is negative, the process proceeds to step 600, in which the counter is decremented. The counter thus maintains a value indicative of the sensed back EMF of the actuator relative to the target back EMF value. This, in turn, provides a representation as to the velocity of the actuator motor relative to a target velocity corresponding to the target BEMF.

From each of steps 590 and 600, the process proceeds to step 610. At step 610, a voltage command value is set equal to the counter times an integrator gain value plus the target voltage. Next, at step 612, a corresponding current command signal is generated based on the voltage command determined at step 610. From step 612, the process proceeds to step 614, in which the actuator motor (e.g., a VCM) is energized based on the current command signal. The energization, for example, may be implemented by controlling activation (e.g., turning ON or OFF) of an array of FETs so that a desired voltage level is applied across the actuator motor commensurate with the voltage command value (V_CMD).

From step 614, the process proceeds to step 620 in which a determination is made as to whether the retract direction is set equal to 1. If the retract direction is set equal to 1, the process proceeds to step 630 in which a determination is made as to whether a clear retract condition command signal has been received. If the clear retract flag condition is not set equal to 1, the process returns to step 560 to sample the back EMF of the actuator motor. If the determination at step 630 is affirmative, indicating that a clear retract flag has been set equal to 1, the process proceeds to step 640 in which the retract sequence ends.

If the determination at step 620 is negative, indicating that the retract direction is not set equal to 1, the process proceeds to step 650. At step 650, a determination is made as to whether the counter is at its maximum value. In the event that the counter is at its maximum value, the process proceeds to step 660 in which Stage 3 of the retract process begins. From step 660, the process proceeds to step 530 in which the voltage control mode begins.

If the determination at step 650 is negative, indicating that the counter has not yet reached a maximum value, the process returns to step 550. Accordingly, the process may continue in the BEMF mode of Stage 2 until it is determined that the counter reaches its maximum value (e.g., based on the INT_STEP being applied) or another input command is provided to either end the BEMF mode or end the retract altogether.

Although the invention has been shown and described with respect to a certain embodiments, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In this regard, it will also be recognized that the invention includes a computer-

What is claimed is:

1. A disk drive read/write head retract system comprising:
a controller having at least two operating modes in response to a receiving a retract request signal, the controller, when in a first operating mode, being operable to provide a deceleration control signal for decelerating a motor in a selected direction for a first time period, the controller operating in a second operating mode after the first operating mode to provide a brake control signal for braking the motor for a second time period,
wherein, when in the second operating mode, the brake control signal results in input terminals of the motor being shorted together at a selected voltage level.

2. The system of claim 1, wherein the selected direction is a user-configurable direction.

3. The system of claim 2, wherein electrical current is applied to the motor according to the selected direction.

4. The system of claim 1, wherein the first time period is functionally related to and less than the second time period.

5. The system of claim 1, wherein the retract request signal is provided in response to a detected power fault condition.

6. The system of claim 1, wherein the controller is user-configurable to enable or disable the first operating mode.

7. A disk drive read/write head retract system comprising:
a controller having at least two operating modes in response to a receiving a retract request signal, the controller, when in a first operating mode, being operable to provide a deceleration control signal for decelerating a motor in a selected direction for a first time period, the controller operating in a second operating mode after the first operating mode to provide a brake control signal for braking the motor for a second time period,
back electromotive force ("EMF") sensor, the back EMF sensor sensing back EMF of the motor and providing a back EMF sensor signal indicative thereof, the controller having a third operating mode after the second operating mode for controlling the motor based on the sensed back EMF relative to a target back EMF.

8. The system of claim 7, further including a comparator operable to compare the sensed back EMF with the target back EMF value and provide an error signal having an error value indicative thereof, the controller controlling the motor based on the error signal.

9. The system of claim 8 further including a counter operative to increment or decrement a counter value based on the error signal, the controller controlling the motor based on an adjusted error signal, the adjusted error signal having a value based on the error value and the counter value.

10. The system of claim 9, wherein the adjusted error signal varies as a function of the counter value and a user-configurable step size control value.

11. The system of claim 10, wherein control of the motor during retract based on the sensed back EMF relative to the target back EMF value corresponds to a back EMF operating mode of the controller, the controller having at least two other operating modes in response to a receiving a retract request signal, the controller, when in a first of the at least two other operating modes, being operable to provide a deceleration control signal for decelerating a motor in a selected direction for a first time period.

12. The system of claim 11, wherein the controller has a user-configurable retract device for enabling or disabling the back EMF operating mode of the controller.

13. The system of claim 11, wherein the controller operates in a second operating mode of the at least two other operating modes after the first operating mode to provide a brake control signal for braking the motor for a second time period.

14. The system of claim 13, wherein electrical current is applied to the motor according to the selected direction.

15. The system of claim 13, wherein, when in the second operating mode, the brake control signal results in input terminals of the motor being shorted together at a selected voltage level.

16. The system of claim 13, wherein the first time period is functionally related to and less than the second time period.

17. The system of claim 13, wherein the controller is user-configurable to enable or disable the first operating mode.

18. The system of claim 11, wherein the selected direction is a user-configurable direction.

19. The system of claim 8, wherein the target back EMF value is a user-configurable value.

20. A disk drive read/write head retract system comprising:
a controller for controlling energization of a motor;
a back electromotive force ("EMF") sensor, the back EMF sensor sensing back EMF of the motor;
wherein, in response to a retract request signal, the controller is operable to control the motor based on the sensed back EMF relative to a target back EMF value
a comparator operable to compare the sensed back EMF with the target back EMF value and provide an error signal indicative thereof, the controller controlling the motor based on the error signal; and
a counter operative to Increment or decrement a counter value based on the error signal, the controller controlling the motor based on an adjusted error signal, the adjusted error signal having a value functionally related to the error value and the counter value.

21. The system of claim 20, wherein the adjusted error value has a value functionally related to the error value and a step size value, the step size value being proportional to a product of the counter value and a user configurable step size control value.

22. A method for controlling a motor for retracting a read/write head in a disk drive system, the method comprising the steps of:
decelerating the motor in a first direction for a first time period in response to retract request signal; and
braking the motor for a second time period,
wherein step of braking is accomplished by electrically shorting together input terminals of the motor to a selected voltage level.

23. The method of claim 22 further including the step of selecting the first direction.

24. The method of claim 23, further including applying electrical current to the motor according to the selected direction.

25. The method of claim 22, wherein the first time period is functionally related to and less than the second time period.

26. The method of claim 22, further including the step of enabling or disabling the step of decelerating.

27. A method for controlling a motor for retracting a read/write head in a disk drive system, the method comprising the steps of:

decelerating the motor in a first direction for a first time period in response to retract request signal; and braking the motor for a second time period, sensing back electromotive force ("EMF") of the motor and providing a back EMF sensor signal indicative thereof, after the step of braking, the motor being controller based on the sensed back EMF relative to a target back EMF.

28. The method of claim 27, further including the steps of comparing the sensed back EMF with the target back EMF value and providing an error signal having an error value indicative thereof, the motor being controlled based on the error signal.

29. The method of claim 28 further including the steps of incrementing or decrementing a counter value based on the error signal and mathematically adjusting the error signal by an amount functionally related to the counter value to provide an adjusted error value, the motor being controlled based on the adjusted error signal.

30. The method of claim 29, wherein the amount functionally related to the counter value is the product of the counter value and user-configurable step size control value.

31. The method of claim 27 further including the step of selecting the target back EMF value.

32. A method for controlling a motor for retracting a read/write head in a disk drive system, the method comprising the steps of:

sensing back electromotive force ("EMF") of the motor:

controlling energization of the motor based on the sensed back EMF relative to a selected target back EMF;

comparing the sensed back EMF with the target back EMF value and providing an error signal indicative thereof, the motor being controlled based on the error signal; and incrementing or decrementing a counter value based on the error signal and mathematically adjusting the error signal by an amount functionally related to the counter value to provide an adjusted error signal, the motor being controlled based on the adjusted error signal.

33. The method of claim 32, wherein the amount functionally related to the counter value is the product of the counter value and user-configurable step size control value.

34. The method of claim 32, wherein prior to the step of sensing, the method further includes operating in an operating mode that includes the steps of decelerating the motor in a first direction for a first time period in response to retract request signal and braking the motor for a second time period.

35. The method of claim 34 further including the step of selecting to enable or disable the step of decelerating.

36. The method of claim 34 further including the step of selecting the first direction.

37. The method of claim 36 further including applying electrical current to the motor according to the selected direction.

38. The method of claim 37, wherein step of braking is accomplished by electrically shorting together input terminals of the motor to a selected voltage level.

39. The system of claim 34, wherein the first time period is functionally related to and less than the second time period.

* * * * *